United States Patent [19]

Sangregory

[11] Patent Number: 5,752,087
[45] Date of Patent: May 12, 1998

[54] ONE-TIME-USE CAMERA WITH FRONT AND REAR COVER PARTS THAT CAN BE BENT APART TO PERMIT BATTERY TO DROP OUT OF CHAMBER

[75] Inventor: Jude A. Sangregory, Spencerport, N.Y.

[73] Assignee: Eastman Kodak Company, Rochester, N.Y.

[21] Appl. No.: 859,344

[22] Filed: May 20, 1997

[51] Int. Cl.$^6$ .................................................. G03B 17/02
[52] U.S. Cl. .................................................. 396/6; 396/539
[58] Field of Search ............................ 396/6, 535, 538, 396/539, 541

[56] References Cited

U.S. PATENT DOCUMENTS

| | | |
|---|---|---|
| 4,896,178 | 1/1990 | Ohmura et al. |
| 4,954,858 | 9/1990 | Ohmura et al. |
| 5,063,400 | 11/1991 | Takei et al. |

*Primary Examiner*—Howard B. Blankenship
*Attorney, Agent, or Firm*—Roger A. Fields

[57] ABSTRACT

A one-time-use camera comprising a chamber containing a film cartridge and having an opening through which the film cartridge may be removed from the chamber, a chamber containing a battery and having an opening through which the battery may be removed from the chamber, and a lid for covering the opening of the chamber that contains the film cartridge, is characterized in that the opening for the chamber that contains the battery is smaller than the battery to prevent the battery from dropping out of the chamber through the opening, and is formed via a pair of resilient cover parts that can be bent apart to enlarge the opening to permit the battery to drop out of the chamber, and the lid is connected with the resilient cover parts to hold the lid over said opening for the chamber that contains the film cartridge and to prevent the cover parts from being bent apart to enlarge the opening for the chamber that contains the battery, and can be disconnected from the resilient cover parts to permit the cover parts to be bent apart.

5 Claims, 2 Drawing Sheets

ONE-TIME-USE CAMERA WITH FRONT AND REAR COVER PARTS THAT CAN BE BENT APART TO PERMIT BATTERY TO DROP OUT OF CHAMBER

FIELD OF THE INVENTION

The invention relates generally to the field of photography, and in particular to one-time-use cameras. More specifically, the invention relates to a one-time-use camera with front and rear cover parts that can be bent apart to permit a battery to drop out of a chamber, when recycling the camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket that engages the filmstrip, a manually rotatable film advance thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash and a battery for powering the flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and may have respective openings for the taking lens, the shutter release button, the film advance thumbwheel, the viewfinder, the frame counter wheel, and a flash emission window for the electronic flash.

To use the one-time-use camera, after the photographer takes a picture he manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip, to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture. If a battery is included in the camera, it is removed from a chamber in the main body part and discarded.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. A battery is provided when the one-time-use camera includes an electronic flash. The front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

Prior art U.S. Pat. No. 4,954,858 issued Sep. 4, 1990 discloses a one-time-use camera that is designed to facilitate removal of the battery and the film cartridge from respective chambers in the main body part. The one-time-use camera comprises a chamber containing a film cartridge and having an opening through which the film cartridge may be removed from the chamber, a chamber containing a battery and having an opening through which the battery may be removed from the chamber, and a lid for covering the opening of the chamber that contains the film cartridge. A cardboard outer box covers the opening of the chamber that contains the battery.

SUMMARY OF THE INVENTION

According to the invention, a one-time-use camera comprising a main body part having an open chamber for a film source and an open chamber for a battery, and a lid for sealing the open chamber for a film source, is characterized in that:

at least one cover part for the main body part at least partially covers the open chamber for a battery to prevent the battery from being removed from the chamber when the cover part is in place, and is resilient to allow the cover part to be bent away from the open chamber for a battery to permit the battery to be removed from the chamber; and the lid is connected to the cover part to hold the lid to seal the open chamber for a film source and to prevent the cover part from being bent away from the open chamber for a battery, and can be disconnected from the cover part to allow the cover part to be bent away from the open chamber for a battery, whereby the battery can be removed from the chamber.

More specifically, a one-time-use camera comprising a chamber containing a film cartridge and having an opening through which the film cartridge may be removed from the chamber, a chamber containing a battery and having an opening through which the battery may be removed from the chamber, and a lid for covering the opening of the chamber that contains the film cartridge, is characterized in that:

the opening for the chamber that contains the battery is smaller than the battery to prevent the battery from dropping out of the chamber through the opening, and is formed via a pair of resilient cover parts that can be bent apart to enlarge the opening to permit the battery to drop out of the chamber; and the lid is connected with the resilient cover parts to hold the lid over said opening for the chamber that contains the film cartridge and to prevent the cover parts from being bent apart to enlarge the opening for the chamber that contains the battery, and can be disconnected from the resilient cover parts to permit the cover parts to be bent apart.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
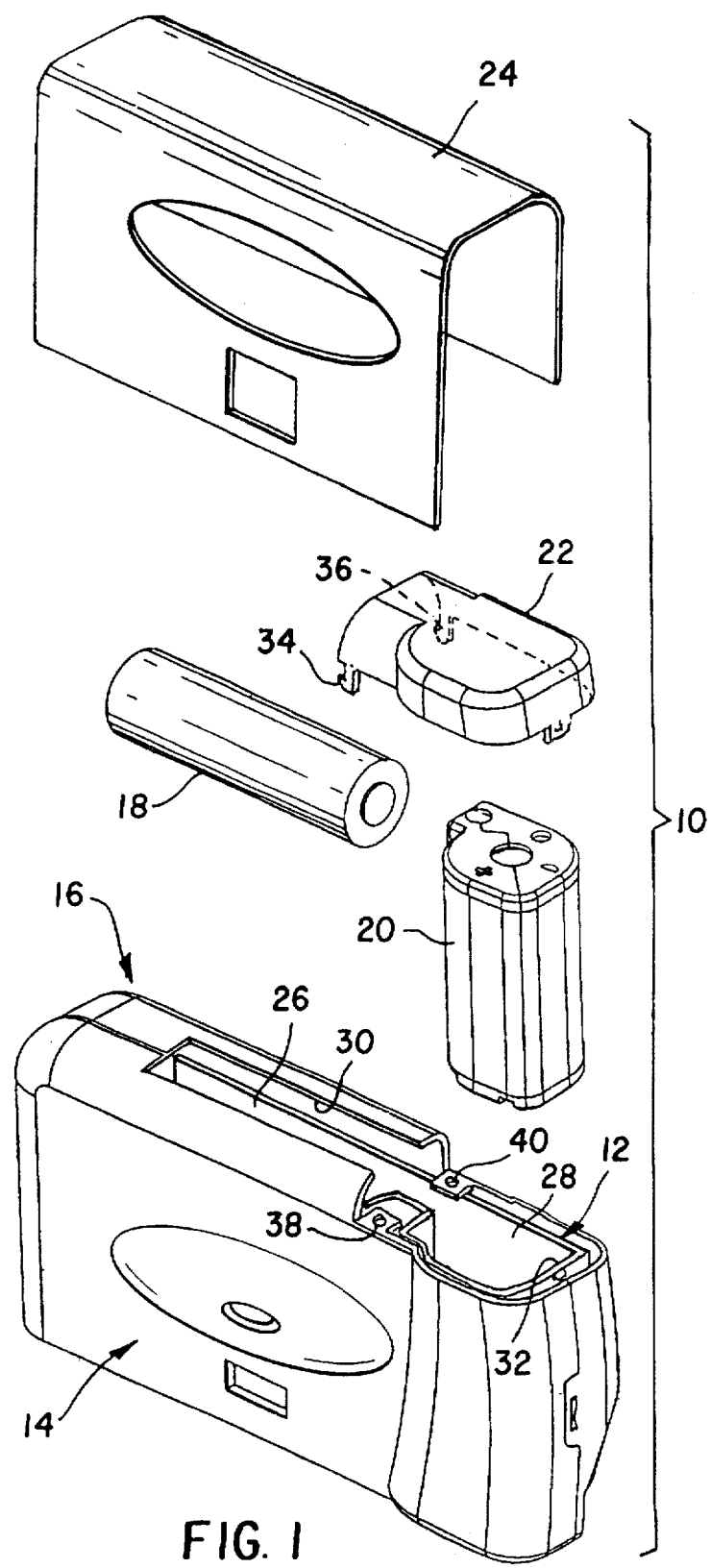
FIG. 1 is an exploded perspective view of a one-time-use camera according to a preferred embodiment of the invention.

Referring now to the drawings, FIG. 1 shows a one-time-use camera 10 comprising a main body part 12, a pair of front and rear cover parts 14 and 16, a battery 18, a film cartridge 20, a bottom lid 22 and a frangible label 24.

The main body part 12 has an open-bottom chamber 26 for the battery 18 and an open-bottom chamber 28 for the film cartridge 20. FIG. 1 shows the one-time-use camera 10 bottom-side-up.

Figure 3:
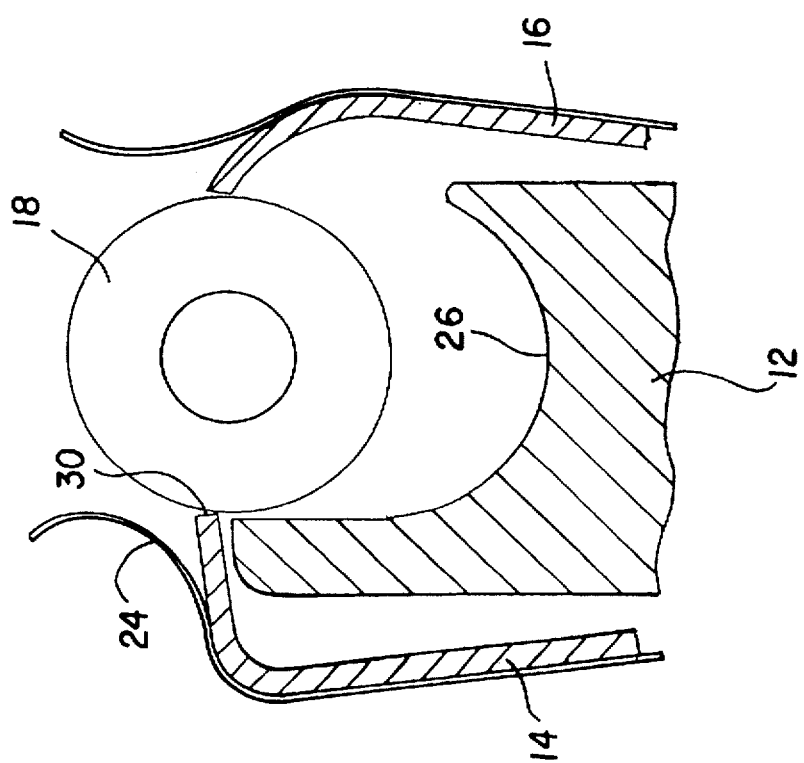
FIGS. 2 and 3 are sectional views of a battery chamber of the one-time-use camera shown closed and opened.
Figure 2:
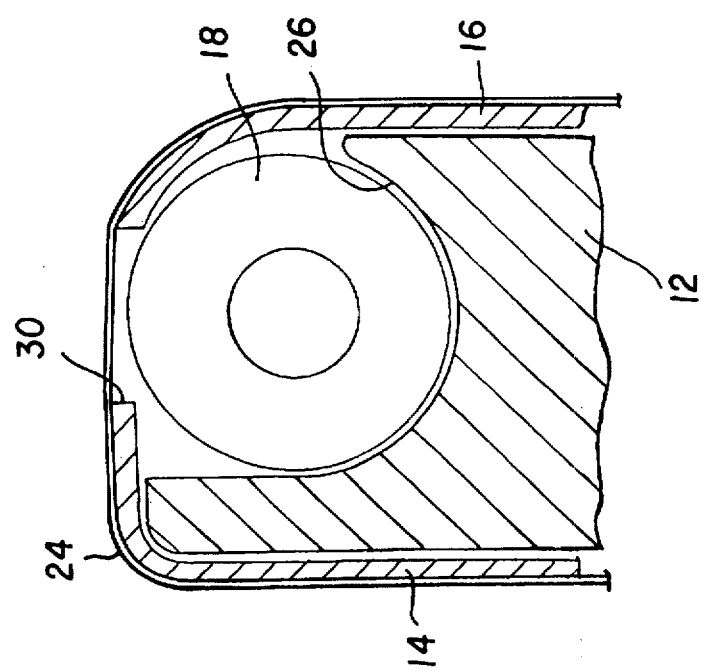

The cover parts 14 and 16, together, form a bottom opening 30 to the chamber 26 for the battery 18. The bottom opening 30 is narrower than the battery 18 to prevent the battery from dropping out of the chamber 26 through the bottom opening when the one-time-camera 10 is right-side-up. The cover parts 14 and 16 are resilient. This allows them to be bent apart as shown in FIG. 3 to widen the bottom opening 30, to permit the battery 18 to drop out of the chamber 26 through the bottom opening when the one-time-use camera 10 is right-side-up. The label 24 ordinarily covers the bottom opening 30 as shown in FIG. 2, but may be torn away from the bottom opening as shown in FIG. 3.

The bottom lid 22 is intended to be placed over a bottom opening 32 to the chamber 28 for the film cartridge 20 to seal the chamber. A pair of hooks 34 and 36 projecting from the bottom lid 22 are received in respective holes 38 and 40 in the front and rear cover parts 14 and 16 to hold the bottom lid over the bottom opening 32 and to prevent the front and rear cover parts from being bent apart to widen the bottom opening 30, to permit the battery 18 to drop out of the chamber 26 through the bottom opening, when the label 24 is torn away from the bottom opening as shown in FIG. 3. The hooks 34 and 36 can be removed from the holes 38 and 40 to permit the cover parts 14 and 16 to be bent apart.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. battery
20. film cartridge
22. bottom lid
24. label
26. chamber for battery
28. chamber for film cartridge
30. bottom opening to the chamber 26
32. bottom opening to the chamber 28
34. hook
36. hook
38. hole
40. hole

What is claimed is:

1. A one-time-use camera comprising a main body part having an open chamber for a film source and an open chamber for a battery, and a lid for sealing said open chamber for a film source, is characterized in that:

at least one cover part for said main body part at least partially covers said open chamber for a battery to prevent the battery from being removed from the chamber when said cover part is in place, and is resilient to allow said cover part to be bent away from said open chamber for a battery to permit the battery to be removed from the chamber; and said lid is connected to said cover part to hold the lid to seal said open chamber for a film source and to prevent the cover part from being bent away from said open chamber for a battery, and can be disconnected from said cover part to allow the cover part to be bent away from said open chamber for a battery, whereby the battery can be removed from the chamber.

2. A one-time-use camera as recited in claim 1, wherein said open chamber for a battery is configured for the battery to be removed from the chamber only at a bottom opening for the chamber, and said cover part at least partially covers said open chamber for a battery at said bottom opening.

3. A one-time-use camera comprising a chamber containing a film cartridge and having an opening through which said film cartridge may be removed from the chamber, a chamber containing a battery and having an opening through which said battery may be removed from the chamber, and a lid for covering said opening of the chamber that contains said film cartridge, is characterized in that:

said opening for the chamber that contains said battery is smaller than the battery to prevent the battery from dropping out of the chamber through the opening, and is formed via a pair of resilient cover parts that can be bent apart to enlarge the opening to permit the battery to drop out of the chamber; and said lid is connected with said resilient cover parts to hold the lid over said opening for the chamber that contains said film cartridge and to prevent the cover parts from being bent apart to enlarge said opening for the chamber that contains said battery, and can be disconnected from said resilient cover parts to permit the cover parts to be bent apart.

4. A one-time-use camera as recited in claim 3, wherein a frangible label covers said opening for the chamber that contains said battery.

5. A one-time-use camera as recited in claim 3, wherein said respective cover parts constitute a pair of front and rear cover parts.

* * * * *